:::

United States Patent [19]

Takahashi et al.

[11] Patent Number: 5,408,335
[45] Date of Patent: Apr. 18, 1995

[54] IMAGE PROCESSING DEVICE FOR CORRECTING AN OFFSET OF AN IMAGE SIGNAL

[75] Inventors: Atsushi Takahashi; Kunimi Hasegawa; Hiroshi Hayashi; Takashi Nakajima; Kouji Yorimoto; Yasuo Komatsu; Makoto Watanabe, all of Saitama, Japan

[73] Assignee: Fuji Xerox Co., Ltd., Tokyo, Japan

[21] Appl. No.: 166,961

[22] Filed: Dec. 15, 1993

[30] Foreign Application Priority Data

Dec. 16, 1992 [JP] Japan .................................. 4-353900

[51] Int. Cl.⁶ .............................................. H04N 1/41
[52] U.S. Cl. .................................... 358/431; 358/446; 348/241; 348/677
[58] Field of Search .............. 358/431, 446, 406, 463, 358/465, 466, 461; 348/677, 678, 691, 696, 241, 313, 697

[56] References Cited

U.S. PATENT DOCUMENTS

| 4,660,082 | 4/1987 | Tomohisa et al. | 358/446 |
| 5,111,311 | 5/1992 | Yamamoto | 358/461 |
| 5,267,053 | 11/1993 | Potucek et al. | 358/446 |
| 5,296,944 | 3/1994 | Suzuki et al. | 358/446 |

FOREIGN PATENT DOCUMENTS 0175365 10/1983 Japan .................................. 358/446

Primary Examiner—Edward L. Coles, Sr.
Assistant Examiner—Fan Lee
Attorney, Agent, or Firm—Finnegan, Henderson, Farabow, Garrett & Dunner

[57] ABSTRACT

An image signal sent from an image sensor is input to the inverting terminal of a differential amplifier. An A/D converter converts an output of the differential amplifier to digital output data. A comparison circuit compares the digital output data with a reference value in a dummy bit period to produce a comparison result, for instance, a difference between the digital output data and the reference value. Based on the comparison result, a correction value setting circuit modifies a correction value so that a DC offset becomes closer to the reference value. For example, the correction value setting circuit adds the difference obtained by the comparison circuit to the correction value. A D/A converter converts the modified correction data to an analog voltage, which is input to the noninverting terminal of the differential amplifier.

7 Claims, 7 Drawing Sheets

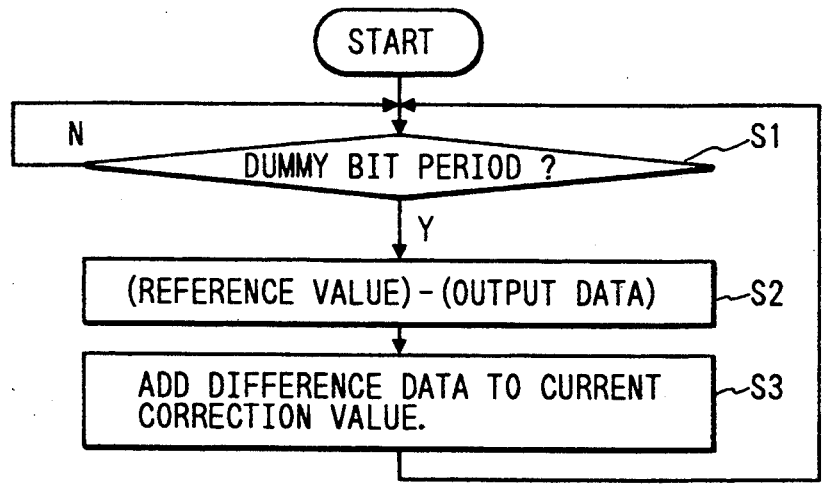
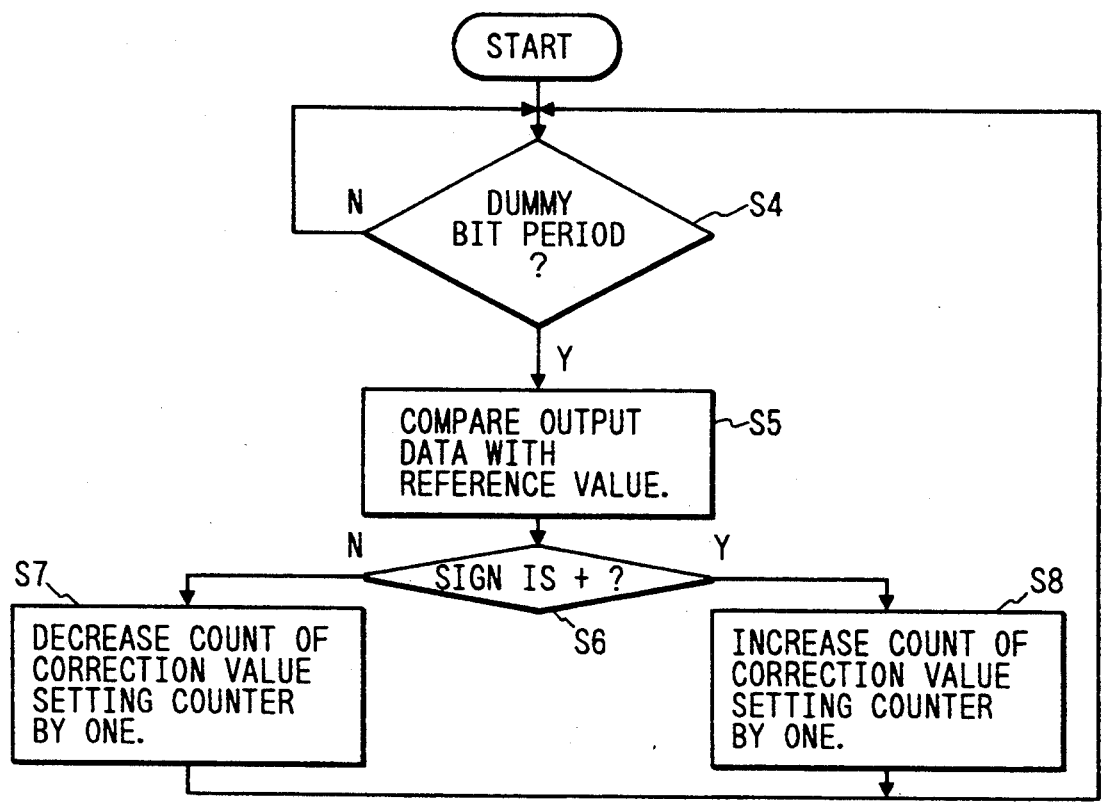

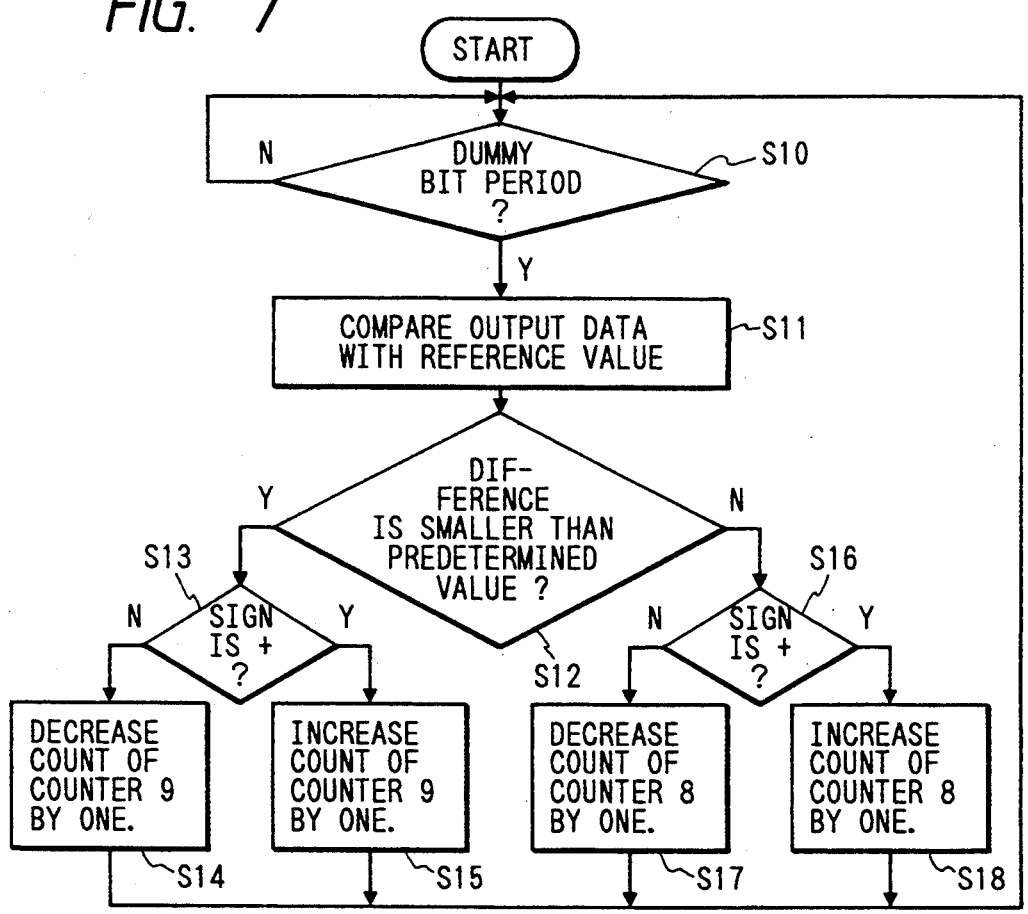
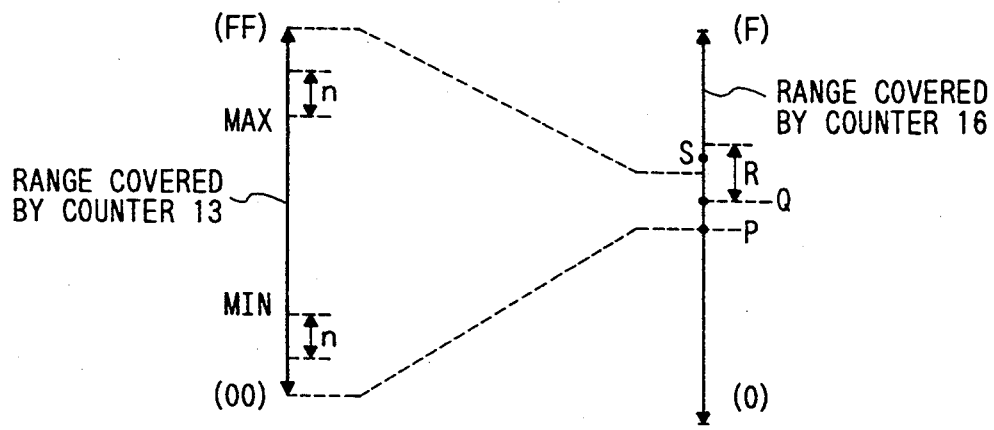

IMAGE PROCESSING DEVICE FOR CORRECTING AN OFFSET OF AN IMAGE SIGNAL

BACKGROUND OF THE INVENTION

The present invention relates to an image processing device and, more specifically, to a scheme for correcting a DC offset of an image signal received from an image sensor to a reference value.

In electrophotographic copiers, image scanners, etc., an image signal received from an image sensor such as a CCD has a DC offset, which is different from one image sensor to another and varies over years and with temperature. Since a variation of the offset value causes a black reference level variation to deteriorate image quality, it is necessary to correct the DC offset to a reference value.

For example, Japanese Patent Application Examined Publication No. Sho. 60-28183 discloses a technique of correcting a DC offset to a reference value. In this technique, an offset level is detected by sampling and holding a dummy bit portion of an image signal. The detected offset level is compared with a reference value to judge which is larger, and a value corresponding to the offset level is obtained by integrating pulse outputs in accordance with a judgment result. A signal representing the value corresponding to the offset level is subtracted from an input signal to cancel the DC offset.

In the above conventional offset canceling technique, noise included in an image signal makes it difficult to correctly adjust the timing of the sample-and-hold operation to perform correct level detection. Since a time constant is set at a relatively large value, time is required for the circuit to reach a stable state, for instance, at the time of power on. Further, the control cannot be performed in a desired manner.

SUMMARY OF THE INVENTION

An object of the present invention is to provide an image processing device which can perform correct and stable DC offset control.

According to the invention, an image processing device for correcting a DC offset of an image signal output from an image sensor, comprises:
- a differential amplifier for receiving the image signal at a first input terminal;
- means for A/D-converting an output signal of the differential amplifier to digital output data;
- means for comparing, in a dummy bit period of the image signal, the digital output data with a reference value and producing a comparison result;
- means for setting a correction value by modifying the correction value based on the comparison result so that the DC offset becomes closer to the reference value; and
- means for D/A-converting the correction value to an analog voltage, which is input to a second input terminal of the differential amplifier.

BRIEF DESCRIPTION OF THE DRAWINGS

FIG. 3 is a flowchart functionally showing the operation of the first embodiment;

FIG. 5 is a flowchart functionally showing the operation of the second embodiment;

FIG. 7 is a flowchart functionally showing the operation of the third embodiment;

FIG. 9 is a chart showing voltage ranges covered by counters of the fourth embodiment;

DESCRIPTION OF THE PREFERRED EMBODIMENTS

Embodiments of the present invention will be hereinafter described in detail with reference to the accompanying drawings.

Figure 1:
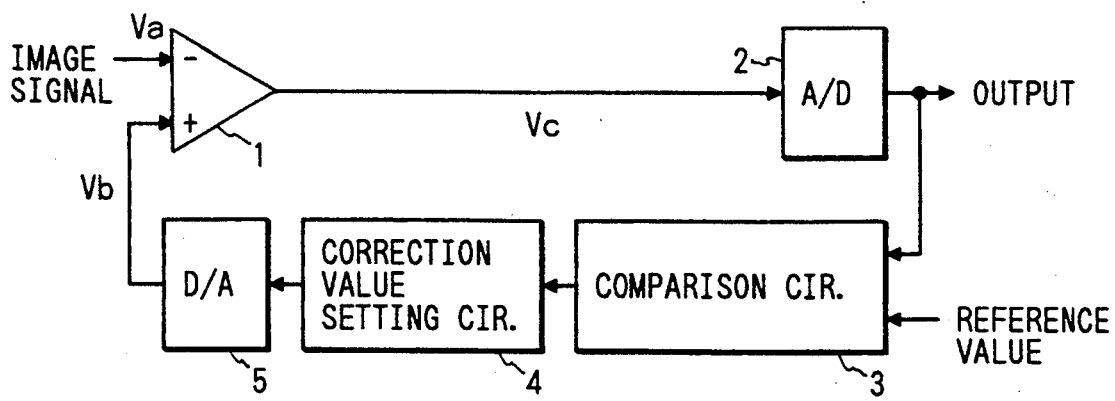
FIG. 1 is a block diagram showing an offset canceling circuit according to a first embodiment of the present invention.

FIG. 1 is a block diagram showing a offset canceling circuit as an image processing device according to a first embodiment of the invention. An image signal Va, which is output from an image sensor such as a CCD, is input to an inverting input terminal of a differential amplifier 1, and an output Vb of a D/A converter 5 is input to its noninverting input terminal. The differential amplifier 1 produces a difference voltage Vc between the two input voltages.

An A/D converter 2 samples and holds the output voltage Vc of the differential amplifier 1, and converts it to, for instance, 8-bit data. The output data of the A/D converter 2 is sent, for certain purposes, to a memory etc. via a correction circuit etc. (not shown) and subjected to signal processing, and also output from the device. A comparison circuit 3 compares the output data of the A/D converter 2 with a predetermined reference value and outputs data representing a difference.

Based on the difference data, a correction value setting circuit 4 calculates, in a non-signal period of the image signal, such a correction value as reduces the difference to zero. A D/A converter 5 converts output data (for instance, 8 bits) of the correction value setting circuit 4 to an analog signal, which is input to the noninverting input terminal of the differential amplifier 1.

The operation of the offset canceling circuit of FIG. 1 will be described below.

Figure 2A:
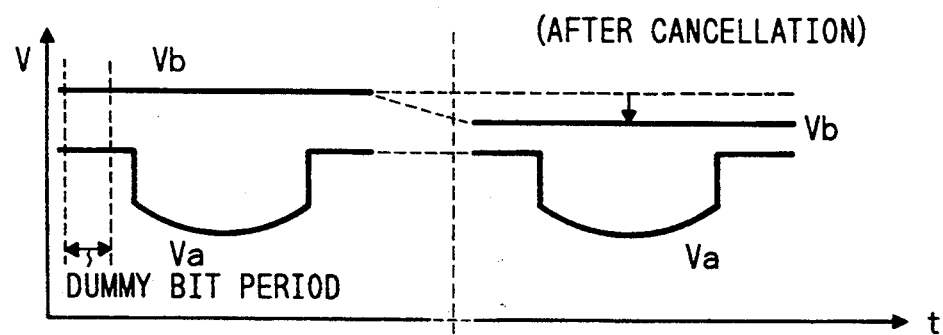
FIGS. 2(a) and 2(b) show signal waveforms of the circuit of FIG. 1.

FIG. 2(a) shows waveforms of the input signals Va and Vb of the differential amplifier 1. A usual CCD image sensor reads a document on a platen of an electrophotographic copier etc. in the horizontal direction to produce a serial signal of one line. FIG. 2(a) shows one-line signal waveforms before the cancellation (left side) and after the cancellation (right side). In FIG. 2(a), Va denotes the input signal having a shading distortion. There exist, on the respective sides of each image signal period, dummy bit periods corresponding to signals output from sensor portions that do not detect light.

Figure 2B:
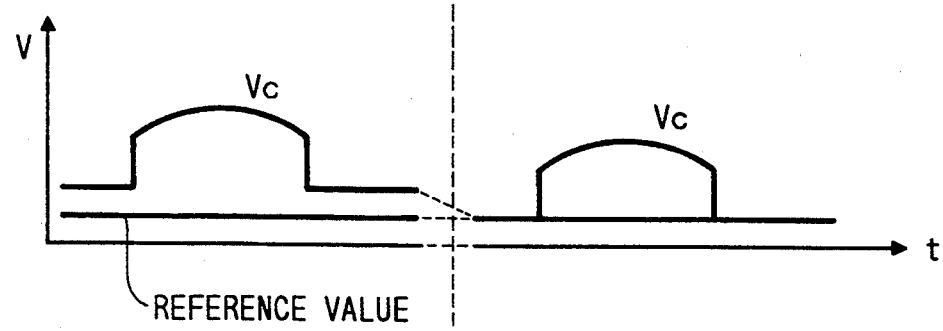

FIG. 2(b) shows a waveform of the output signal Vc (=Vb−Va) of the differential amplifier 1. Since the image signal is input to the inverting input terminal, the waveform of the signal Vc is an inversion of the waveform of the signal Va. The signal Vc is always sampled and A/D-converted by the A/D converter 2.

The comparison circuit 3 produces the data representing the difference between the output data of the A/D converter 2 and the reference value ((reference value)−(output data)). The correction value setting circuit 4 calculates the correction value based on the difference data from the comparison circuit 3 in synchronism with the dummy bit period of the input signal, and holds the calculated correction value while outputs it. The calculation is such that output=(current correction value)+(difference data from comparison circuit). A circuit for this calculation can easily be constructed by using an adder (subtracter). A signal indicating the timing of the dummy bit period is supplied from an image sensor control circuit (not shown).

The output data of the correction value setting circuit 4 is converted to the analog signal by the D/A converter 5 to becomes the corrected signal Vb as shown on the right side of FIG. 2(a). As a result, as shown on the right side of FIG. 2(b), the dummy bit period of the output signal Vc has a level approximately equal to the reference value.

FIG. 3 is a flowchart functionally showing the operation of the comparison circuit 3 and the correction value setting circuit 4. In step S1, it is judged whether the present instant belongs to the dummy bit period. If the judgment is negative, step S1 is repeated. If the judgment of step S1 turns affirmative, the process goes to step S2. In step S2, an operation of (reference value)−(output data) is performed.

In step S3, the difference data obtained in step S2 is added to the current correction value being held by the correction value setting circuit 4, and a new correction value is held by the circuit 4 while output there from. The process returns to step S1 to repeat the above operation. Therefore, the correction value is updated once a line.

The above-described offset canceling circuit enables correct and stable DC offset cancellation.

A second embodiment of the invention will be described below.

Figure 4:
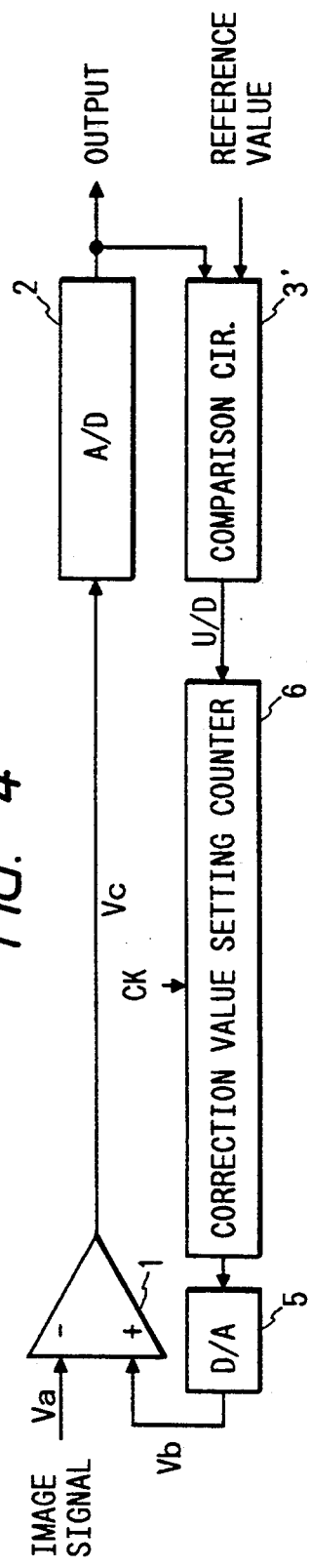
FIG. 4 is a block diagram showing an offset canceling circuit according to a second embodiment of the invention.

FIG. 4 is a block diagram showing an offset canceling circuit according to the second embodiment. In FIG. 4, the parts equivalent to those in FIG. 1 are given the same reference numerals. The second embodiment is different from the first embodiment (FIG. 1) in a portion related to the output of a comparison circuit 3' and a correction value setting counter 6. The following description will be directed to those portions.

The comparison circuit 3' produces a U/D (up/-down) signal based on a relationship in magnitude between the reference value and the output data of the A/D converter 2. Based on the U/D signal, the correction value setting counter 6 increases or decreases a count value of a counter in response to a pulse CK sent from a control circuit (not shown) in the dummy bit period. The count value is input to the D/A converter 5 as the correction value.

FIG. 5 is a flowchart functionally showing the operation of the comparison circuit 3' and the correction value setting counter 6. In step S4, it is judged whether the present instant belongs to the dummy period. If the judgment is negative, step S4 is repeated. If the judgment of step S4 turns affirmative, the process goes to step S5. In step S5, the sign (plus or minus) of a result of an operation of (reference value)−(output data) is determined.

In step S6, it is judged whether the sign determined in step S5 is plus or not. If the judgment is affirmative, the process goes to step S8. If the sign is minus, the process goes to step S7. In step S7, the count of the correction value setting counter 6 is decreased by one. In step S8, it is increased by one. Then, the process returns to step S4 to repeat the above operation. Therefore, the correction value is updated once a line.

As described above, the offset canceling circuit can be constructed in a simple form. Since the correction value changes gradually, i.e., one step per line, variable noise due to the correction is small.

A third embodiment of the invention will be described below.

Figure 6:
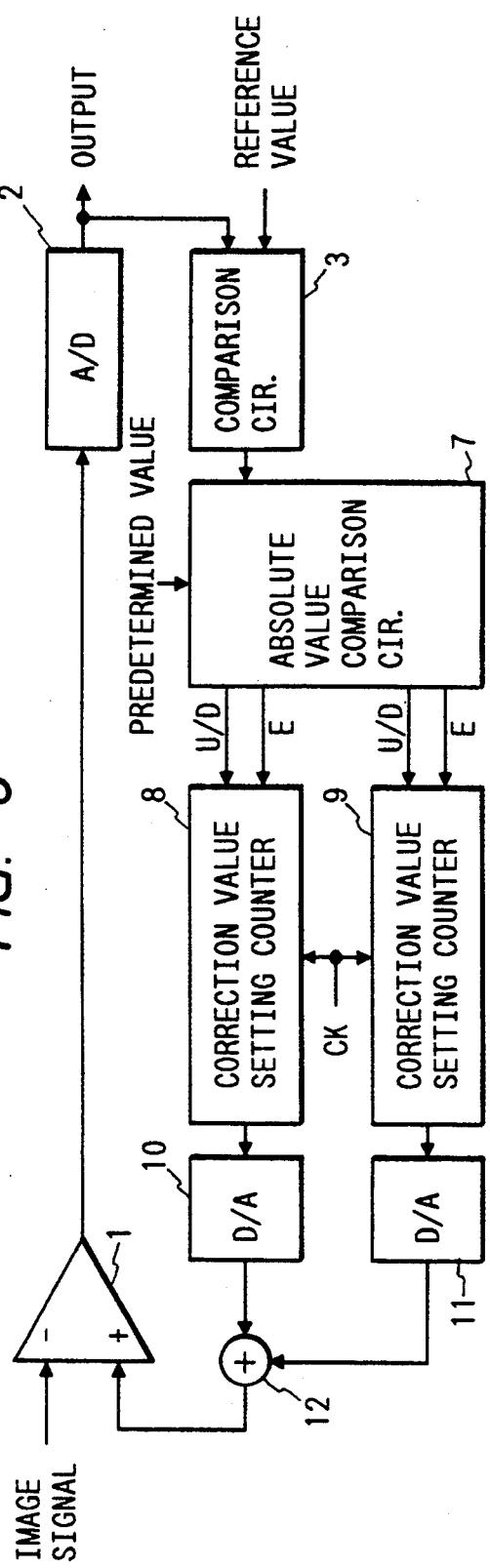
FIG. 6 is a block diagram showing an offset canceling circuit according to a third embodiment of the invention.

FIG. 6 is a block diagram showing an offset canceling circuit according to the third embodiment. In FIG. 6, the parts equivalent to those in FIG. 1 are given the same reference numerals. The third embodiment is different from the first embodiment (FIG. 1) in a portion from an absolute value comparison circuit 7 to an adder 12, and the following description will be directed to this portion.

The absolute value comparison circuit 7 compares, with a predetermined value, the absolute value of the difference data that is output from the comparison circuit 3. If the absolute value is larger than the predetermined value, the absolute value comparison circuit 7 supplies a correction value setting counter 8 with a U/D signal, which is produced on the basis of the sign of the difference, and an E (enable) signal for enabling the operation of the counter 8. If the absolute value is smaller than the predetermined value, the absolute value comparison circuit 7 supplies another correction value setting counter 9 with the U/D signal and the E signal.

A count value of one of the correction value setting counters 8 and 9 which has received the E signal from the absolute value comparison circuit 7 is increased or decreased based on the U/D signal in response to a pulse CK sent from a control circuit (not shown) in the dummy bit period.

The count values of the counters 8 and 9 are input, as correction values, to D/A converters 10 and 11, respectively. An output voltage section of the D/A converter 10 corresponding to one step of the input data thereto is larger than that of the D/A converter 11. Therefore, D/A converter 10 can follow a large variation more quickly. On the other hand, the D/A converter 11, which has a smaller output voltage section for one step of the input data, can follow a small variation with high accuracy. An adder 12 adds together, by an analog type operation, the output voltages of the two D/A converters 10 and 11. An addition voltage is input to the differential amplifier 1.

FIG. 7 is a flowchart functionally showing the operation of the portion from the comparison circuit 3 to the correction value setting counters 8 and 9 of FIG. 6. In step S10, it is judged whether the present instant belongs to the dummy bit period. If the judgment is negative, step S10 is repeated. If the judgment of step S10 turns affirmative, the process goes to step S11. In step S11, an operation of (reference value)−(output data) is performed to produce difference data.

In step S12, it is judged whether the absolute value of the difference data obtained in step S11 is smaller the predetermined value. If the judgment is affirmative, the process goes to step S13. If not, the process goes to step S16.

In step S13, it is judged whether the sign of the difference data obtained in step S11 is plus or not. If the sign is plus, the process goes to step S15. If the sign is minus, the process goes to step S14. In step S14, the count value of the correction value setting counter 9 is decreased by one. In step S15, the count value of the correction value setting counter 9 is increased by one.

In step S16, it is judged whether the sign of the difference data obtained in step S11 is plus or not. If the sign is plus, the process goes to step S18. If the sign is minus, the process goes to step S17. In step S17, the count value of the correction value setting counter 8 is decreased by one. In step S18, the count value of the correction value setting counter 8 is increased by one.

If one of steps S14 to S18 is executed, the process returns to step S10 to repeat the above operation. Therefore, the correction value is updated once a line. With the above constitution, the offset canceling circuit can follow a large variation (as occurs at a build-up period) quickly by large correction steps, and can follow a small variation (during a stable period) with high accuracy by small correction steps.

When the correction value setting counter 9 for smaller steps overflows or underflows, the counting operation may be stopped at the maximum value (e.g., FF) or zero. In this case, the count value of the correction value setting counter 8 for larger steps may be increased or decreased.

A fourth embodiment of the invention will be described below.

Figure 8:
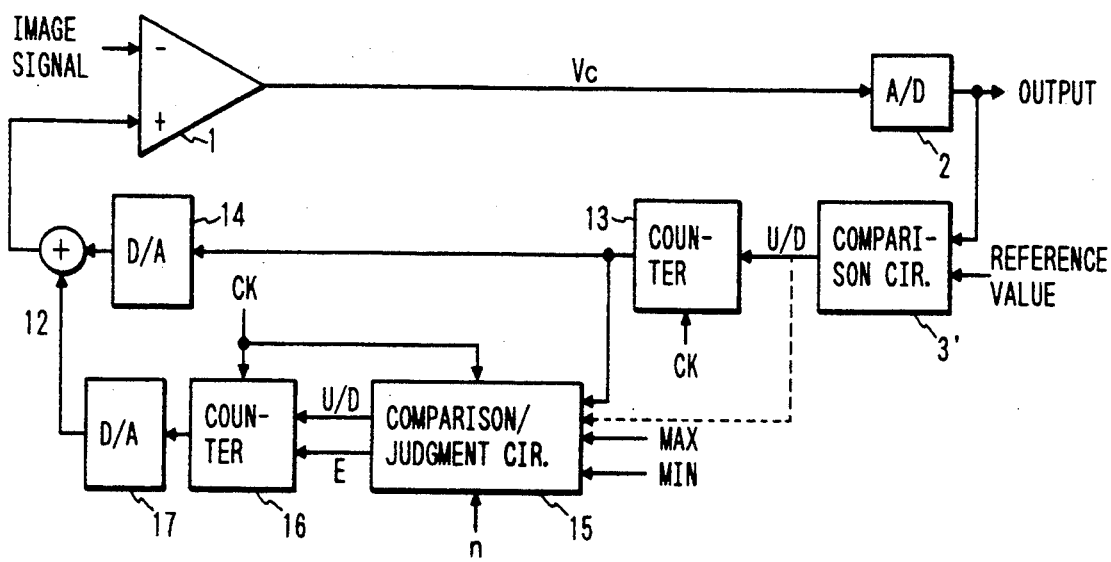
FIG. 8 is a block diagram showing an offset canceling circuit according to a third embodiment of the invention.

FIG. 8 is a block diagram showing an offset canceling circuit according to the fourth embodiment. In FIG. 8, the parts equivalent to those in FIG. 4 are given the same reference numerals. The fourth embodiment is different from the second embodiment (FIG. 4) in a portion from a counter 13 to an adder 12, and the following description will be directed to this portion.

Based on the U/D signal from the comparison circuit 3′, the counter 13 increases or decreases its count value in response to a pulse CK sent from a control circuit (not shown) in the dummy bit period. The count value is input to a D/A converter 14. An output voltage section of the D/A converter 14 corresponding to one step of the input data thereto is smaller than that of a D/A converter 17. The total voltage range (i.e., maximum output voltage) of the D/A converter 14 can be smaller than a variation range necessary for the signal Vb.

A comparison/judgment circuit 15 receives the output data of the counter 13 and compares it with predetermined values MAX and MIN (MAX>MIN) by use of two comparators incorporated therein. If either of counters associated with the respective comparators detects that the output data of the counter 13 exceeds the MAX value or falls below the MIN value n consecutive times (n≧1), the comparison/judgment circuit 15 supplies a counter 16 with a U/D signal and an E signal corresponding to the MAX or MIN value.

Only when receiving the E signal, the counter 16 increases or decreases its count value based on the U/D signal input thereto in response to a pulse CK′ sent from the control circuit (not shown) in the dummy bit period. The pulse CK′ may be delayed from the pulse CK to update the count values of both counters 13 and 16. Alternatively, the same pulse CK may be supplied to the counter 16, in which case the counter 16 is controlled using the count value of the counter 13 of a preceding line.

The D/A converter 17 converts the count value of the counter to an analog voltage. An output voltage section of the D/A converter 17 corresponding to one step of the input data thereto is set larger than that of the D/A counter 14 so that the total voltage range covers the entire variation range necessary for the signal Vb. The adder 12 adds together, by an analog operation, the output voltages of the two D/A converters 10 and 11. An addition voltage is input to the differential amplifier 1.

FIG. 9 shows an example of voltage ranges covered by the counters 13 and 16. For example, the counter 13 is an 8-bit counter. The MAX and MIN values are respectively set in the vicinity of the upper limit FF and zero such that (FF−MAX)>n and MIN>n. The counter 16 covers the entire voltage range necessary for the signal Vb, and the counter 13 covers only part of the range of the counter 16.

For example, where data corresponding to a target value of the signal Vb is located at point S that is out of the range covered by the counter 13, the count value of the counter 13 continues to increase. When the count value of the counter 13 has increased n times after exceeding MAX, the count value of the counter 16 increases by one and its output changes from point P and point Q. As a result, the range covered by the counter 13 shifts to a range R (see FIG. 9) to thereby include point S.

Figure 10:
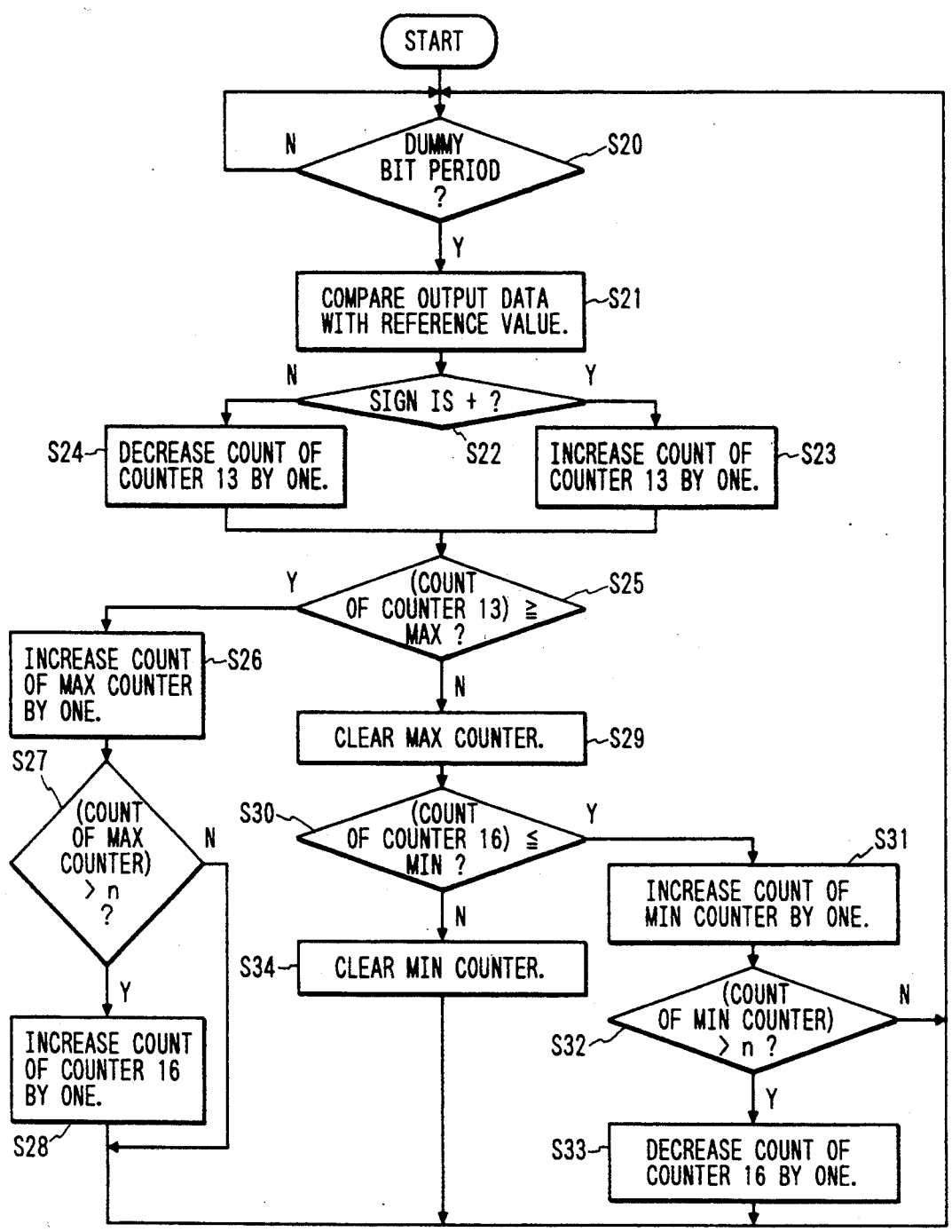
FIG. 10 is a flowchart functionally showing the operation of the fourth embodiment.

FIG. 10 is a flowchart functionally showing the operation from the comparator 3 to the correction value setting counter 16 of FIG. 8. In step S20, it is judged whether the present instant belongs to the dummy bit period. If the judgment is negative, step S20 is repeated. If the judgment of step S20 turns affirmative, the process goes to step S21. In step S21, an operation of (reference value)−(output data) is performed to produce difference data.

In step S22, it is judged whether the sign of the difference data obtained in step S22 is plus or not. If the sign is plus, the process goes to step S23. If the sign is minus, the process goes to step S24. In step S24, the count value of the counter 13 is decreased by one. In step S23, the count value of the counter 13 is increased by one.

In step S25, it is judged whether the count value of the counter 13 is larger than or equal to MAX. If the judgment is affirmative, the process goes to step S26. In step S26, the count value of the MAX counter is increased by one. In step S27, it is judged whether the count value of the MAX counter has exceeded n. If the judgment is affirmative, the process goes to step S28, where the count value of the counter 16 is increased by one. If the count value of the counter 13 is smaller than MAX in step S25, the process goes to step S29 to clear the MAX counter.

In step S30, it is judged whether the count value of the counter 13 is smaller than or equal to MIN. If the judgment is affirmative, the process goes to step S31, where the count value of the MIN counter is increased by one. In step S32, it is judged whether the count value of the MIN counter has exceeded n. If the judgment is affirmative, the process goes to step S33, where the count value of the counter 16 is decreased by one. If the count value of the counter 13 is larger than MIN in step S30, the process goes to step S34 to clear the MIN counter.

After completion of the series of operation described above, the process returns to step S20 to repeat the above operation. Therefore, the correction value is updated one a line. With the above constitution, the offset canceling circuit can follow a large variation quickly by large correction steps, and can follow a small variation with high accuracy by small correction steps.

If the counter 13 for smaller steps is constructed so as to stop its counting operation at the maximum value (e.g., FF) and zero to avoid an overflow and underflow, the MAX and MIN values can be set at FF and 0, respectively. Further, the offset canceling circuit may be constructed such that the MIN counter is cleared when and count value of the counter 13 is increased and the MAX counter is cleared when it is decreased.

A fifth embodiment of the invention will be described below.

Figure 11:
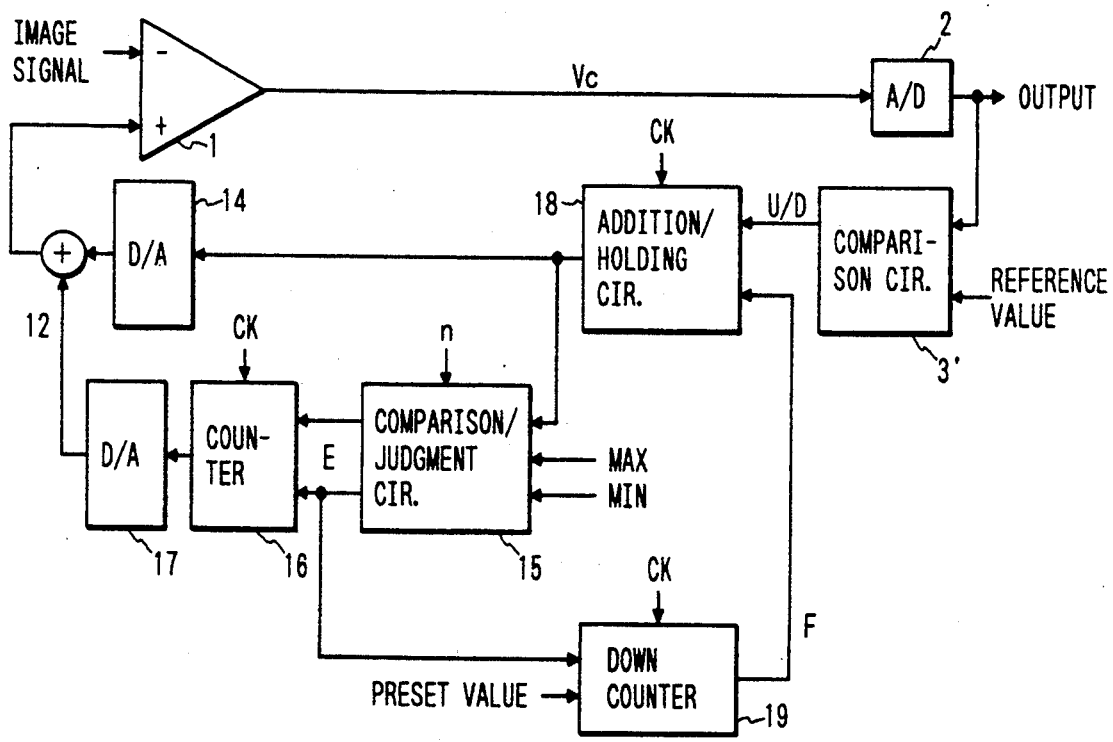
FIG. 11 is a block diagram showing an offset canceling circuit according to a fourth embodiment of the invention.

FIG. 11 is a block diagram showing an offset canceling circuit according to the fifth embodiment. In FIG. 11, the parts equivalent to those in FIG. 8 are given the same reference numerals. The fifth embodiment is different from the fourth embodiment (FIG. 8) in a portion from an addition/holding circuit 18 and a down counter 19, and the following description is directed to this portion.

The addition/holding circuit 18 consists of an adder and a register. Based on the U/D signal supplied from the comparison circuit 3, the adder adds or subtracts an output value F of the down counter 19 to or from a value of the register. The register latches an output of the adder in response to a pulse CK sent from a control circuit (not shown) in the dummy bit period, and outputs the latched value.

Normally the down counter 19 does not perform its counting operation with a count value of 1. But a preset value (e.g., 16) is set in the down counter 19 when it has received an E (enable) signal from the comparison/judgment circuit 15, and its count value is decreased by one per line in response to the pulse CK. When the count value has reached 1, the down counter 19 stops its counting operation.

A flowchart (not shown) showing the operation of the fifth embodiment is as follows. In the flowchart for the fourth embodiment shown in FIG. 10, the counting step of the counter in steps S24 and S25 is changed to F. An operation of setting F at the preset value is added to steps S28 and S33. Further, an operation of subtracting 1 from F when F is larger than or equal to 2 is added after step S34. With the above constitution, immediately after the operation of the counter 16, a large value is added to or subtracted from the value of the register of the addition/holding circuit 18 to allow the output data to quickly reach the reference value.

Finally, a sixth embodiment of the invention will be described below.

Usually, a CCD image sensor outputs signals of odd photoelectric conversion elements and signals of even photoelectric conversion elements via different charge transfer circuits. As a result, the odd and even image signal levels may have a difference. This embodiment is intended to correct such a difference.

Figure 12:
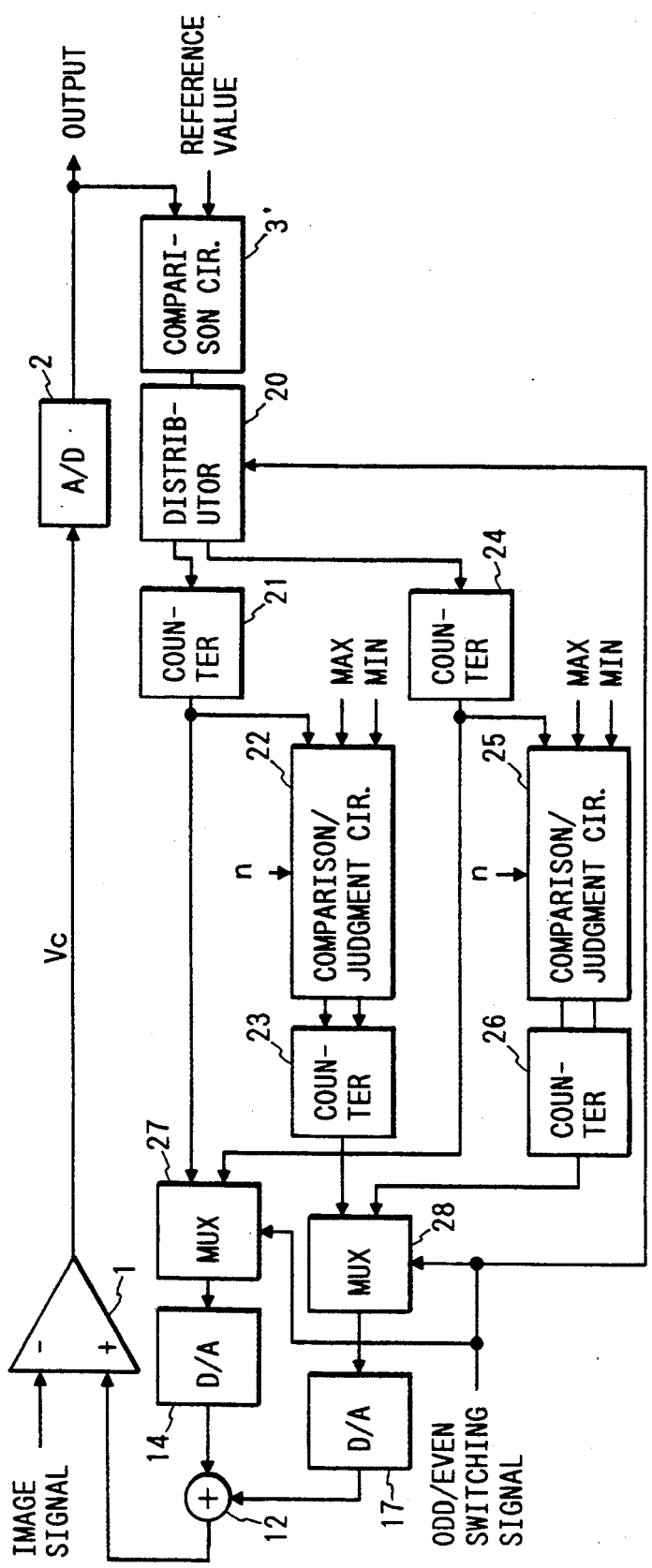
FIG. 12 is a block diagram showing an offset canceling circuit according to a fifth embodiment of the invention.

FIG. 12 is a block diagram showing an offset canceling circuit according to the sixth embodiment. In FIG. 12, the parts equivalent to those in FIG. 8 are given the same reference numerals. The sixth embodiment is difference from the fourth embodiment (FIG. 8) in that there are a pair of correction value setting circuits each consisting of two counters and a comparison/judgment circuit. A distributor 20 supplies the pair of correction value setting circuits with the U/D signals (i.e., output of the counter 3') and E (enable) signals for alternately enabling the counters 21 and 24 to operate.

Output data of the counters 21 and 24 are sent to the D/A converter 14 via a multiplexer 27, and output data of the counters 23 and 26 are sent to the D/A converter 17 via a multiplexer 28. The distributor 20 and the multiplexers 27 and 28 are controlled by an odd/even switching signal sent from a control circuit (not shown).

Figure 13B:
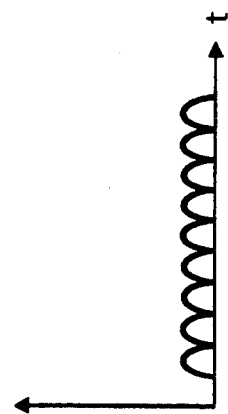
FIGS. 13(a) and 13(b) show waveforms of corrected image signals in the fourth embodiment and the sixth embodiment, respectively.
Figure 13A:
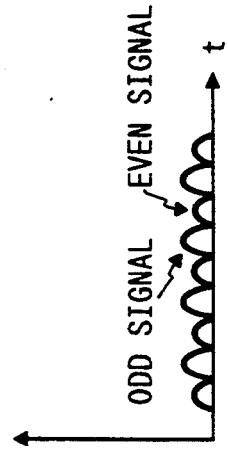

FIG. 13(a) shows an enlarged waveform of the signal Vc after being subjected to the correction in the dummy bit period in the fourth embodiment. In this waveform, odd image signals and even signal levels have different levels. FIG. 13(b) shows a waveform of the signal Vc of the sixth embodiment. In this embodiment, since the odd and even image signals are corrected independently, the corrected outputs of the respective image signals can be made equal to the same reference value (see FIG. 13(b)). While the sixth embodiment employs a pair of correction value setting circuits each of which is the circuit of the fourth embodiment, the correction value setting circuit of the first to third embodiments may also be used in the same manner.

The six embodiments have been described above, and the following modifications are also possible.

While the correction value can be calculated by hardware, it may also be obtained by calculating the correction value by a CPU using the output of the A/D converter 2 and setting the calculated value in the D/A converter 5. Further, where two kinds of correction circuits are used as in the case of the third to sixth embodiments, the signal Vb may be generated by a single D/A converter after addition of two kinds of digital output values.

As described above, according to the invention, since the control is performed using digital data, correct and stable DC offset control can be performed.

What is claimed is:

1. An image processing device for correcting a DC offset of an image signal output from an image sensor, while the image sensor is reading an image comprising:
   a differential amplifier for receiving the image signal at a first input terminal;
   means for A/D- converting an output signal of the differential amplifier to digital output data;
   means for comparing, in a dummy bit period of the image signal, the digital output data with a reference value and producing a comparison result, said dummy bit period corresponding to a portion of the image sensor which doesn't detect light;
   means for setting a correction value by modifying the correction value based on the comparison result so that the DC offset becomes closer to the reference value; and
   means for D/A-converting the correction value to an analog voltage, which is input to a second input terminal of the differential amplifier.

2. The image processing device of claim 1, wherein the comparing means produces a difference between the digital output data and the reference value, and the correction value setting means adds the difference to the correction value.

3. The image processing device of claim 1, wherein the correction value setting means comprises a counter, and a count value of the counter increases or decreases in accordance with the comparison result.

4. The image processing device of claim 1, wherein the correction value setting means comprises first correction value modifying means for modifying the correction value with a large modifying step and second correction value modifying means for modifying the correction value with a small modifying step, and wherein the D/A converting means comprises a first D/A converter for D/A-converting an output of the first correction value modifying means, a second D/A converter for D/A-converting an output of the second correction value modifying means, and an adder for adding together outputs of the first and second D/A converters.

5. The image processing device of claim 4, the second correction value modifying means operates only when the output of the first correction value modifying means has gone beyond a predetermined range.

6. The image processing device of claim 5, wherein when the second correction value modifying means operates, the modifying step of the first correction value modifying means is temporarily increased.

7. The image processing device of claim 1, wherein the correction value setting means comprises first correction value modifying means for modifying a correction value for odd pixels, and a second correction value modifying means for modifying a correction value for even pixels, the first and second correction value modifying means operate in a time divisional manner, and wherein the same reference value is used for the first and second correction value modifying means.

* * * * *